June 12, 1956 M. WEISSBRODT 2,749,661
TOY FREIGHT CAR
Filed Dec. 4, 1952
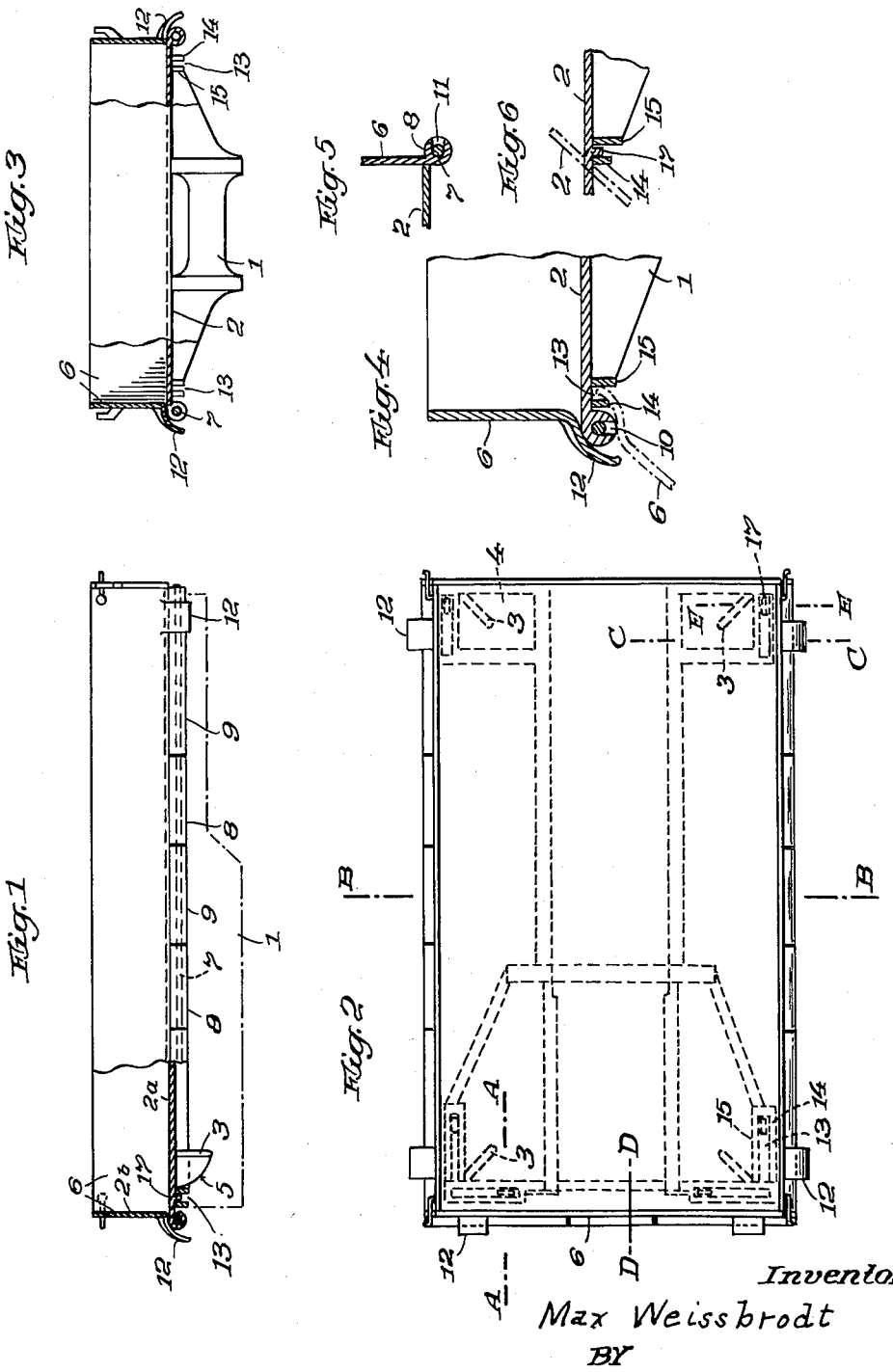
Inventor:
Max Weissbrodt
BY
Young, Emery, Thompson
Attys.

United States Patent Office 2,749,661
Patented June 12, 1956

2,749,661
TOY FREIGHT CAR

Max Weissbrodt, Coburg, Germany, assignor to O. & M. Hausser, Coburg, Germany, a German firm Application December 4, 1952, Serial No. 323,955

Claims priority, application Germany December 24, 1951

1 Claim. (Cl. 46—214)

The invention relates to a toy freight car provided with a tiltable body and hinged side walls.

The known freight cars of this type are provided at each side, where the body may be tipped, with a hinge between the body and the chassis around the axis of which the body is tipped. Moreover at each side a hinge is provided between the body and the respective side wall allowing the side wall to be tilted over. Therefore, if it is desired to have the car or the walls tilted alternately towards two directions, as usual, a plurality of hinges is required the construction and mounting of which is difficult for the reason that they have to be so small that they do not impair the appearance of the whole vehicle. In addition, devices are required by which the hinges which are not operative during a tilting process are made ineffective, i. e. in order to have the possibility to tilt towards the one direction the hinges at the two other sides must be made ineffective. Thereby the structure and the assembling is furthermore complicated.

The invention remedies this drawback by providing at each side of the car a tilting hinge only between the body of the car and the respective side wall, while the tipping hinges between the body and the chassis are dispensed with. For the purpose of allowing the body of the car to be tipped with respect to the chassis according to the invention, the construction is such that the side wall provided at that side towards which the body is to be tipped, forms the tipping hinge for the car body after said side wall is tilted over. Thereby the essential advantage is obtained that tilting joints such as hinges are only required between the side walls and the body. A further advantage obtained thereby consists therein that the body is secured in its position, although it is placed loosely onto the chassis and is adapted to be lifted off. The body may therefore be removed from the chassis, if required, quickly and easily and without special disassembling means. This advantage is of importance especially if the usual body e. g. a usual freight car platform is to be exchanged for another body to allow the car to be modified, e. g. a freight car to be changed to a cattle car or to a fire brigade car.

Preferably the invention has for an object the provision of a side wall which is hingedly connected to the body and is provided with lugs extending downwardly beyond the hinge, said lugs engaging, when the side wall is tilted down, a groove of the chassis formed by two ribs thereby forming together with said groove the tipping stop for the body. The edge of this groove on that side towards which the wall is to be tilted then serves as a tipping axis for tipping the body.

According to the invention, the body is placed onto the chassis and therefore is not maintained on a tipping axis by additional securing means. Small webs abutting against an abutment of the chassis, may be provided at the lower side, thereby preventing lateral sliding of the body in the tilted position, said abutment being provided at that side of the chassis towards which the body is to be tipped. Preferably these securing webs are arranged so as to project into the grooves of the chassis adjacent the lugs of the tipping joint. Therefore, the invention is also characterized by its constructional simplicity because only small web like lugs are required at the lower side of the bottom of the body for providing essential security.

According to a further feature of the invention the hinge between the body and the side wall consists of hinge eyes fastened partly to the body and partly to the wall and comprising a pivot, said hinge eyes being provided with radial slots staggered relatively to each other, and said slots having at least a width equal to the diameter of the pivot. Consequently the hinge eyes fastened to the body as well as those fastened to the wall may be pushed easily over the pivot in a radial direction. It is therefore not necessary to insert the rather thin pivot axially into a boring of the hinge, thereby avoiding a generally very troublesome operation. Moreover such construction has the advantage that the manufacture is very much simplified, if the parts of the freight car, especially the walls and the body, are manufactured of artificial material by die casting. If closed tube like hinge eyes are used in the manner usual up to now complicated die casting tools are required with suitable sliders. In contradistinction thereto the invention allows the die casting tools to be used without such sliders.

The drawing shows by way of example an embodiment of the invention.

Fig. 1 is a side elevation of a freight car body partly in section taken on line A—A of Fig. 2, Fig. 2 is a plan view of Fig. 1, Fig. 3 is a section taken on line B—B of Fig. 2, Fig. 4 is a section taken on line C—C of Fig. 2 on an enlarged scale, Fig. 5 is a section taken on line D—D of Fig. 2 on an enlarged scale, and Fig. 6 is a section taken on line E—E of Fig. 2.

The chassis 1 of the freight car is only indicated in Fig. 1 by dot-and-dash lines. The body 2 comprises a bottom plate 2a, and side walls 6 hingedly connected with each other. For the purpose of avoiding troublesome assembly in placing the body 2 onto the chassis 1 and in order to easily obtain the correct position the body may be provided at the lower side of its bottom with guiding ribs 3 engaging an angular recess 4 of the chassis as best seen in Fig. 2. These ribs 3 extend in the manner shown in Fig. 2, and are suitably provided with a rounded edge 5 as shown in Fig. 1.

The side walls 6 are hinged to the body 2. For this purpose, in the embodiment shown in the drawing, a hinge is provided extending over the entire length and consisting of the hinge pivot or pin 7 and the hinge eyes 8 and 9, the one (8) being attached to the wall and the other (9) to the body. While hinge eyes have generally the form of closed sleeves or tubes these hinge eyes are illustrated in the drawing so as to be provided with radial slots 10 or 11 respectively. These slots are arranged so that the slots of the eyes 8 attached to the wall are angularly displaced with respect to the slots of the eyes 9 attached to the body 2. In the embodiment shown in the drawing the slots 10 are directed downwardly and the slots 11 are directed laterally and outwardly or at right angles relative to the slots 10. Therefore, the wall with its eyes as well as the body with its eyes may be pushed laterally over the hinge pivot. As soon as these parts are in their working position they form a continuous supporting tube for the pivot 7.

Each of the tiltable walls is provided with lugs 12 projecting downwardly somewhat beyond the pivot of the hinge, as best shown in Fig. 4. If the wall is tilted into the position indicated in Fig. 4 by dot-and-dash lines, these lugs engage a recess 13 provided on the lower side of the body 2 formed by two ribs 14, 15, as shown in the drawing. The lugs 12 of the wall 6 together with the recess 13 and the rib 14 form the tipping joint of the body.

As already mentioned securing means may be provided although such means are not absolutely required, said securing means preventing the body when tipped from sliding off laterally. For this purpose at the lower side of the body small supporting ribs 17 mounted on the bottom 2a may be provided engaging the groove 13 as clearly shown in Figs. 1, 2 and 5. These supporting ribs abut, as shown in Fig. 6, against the rib 14 of the recess 13 if the body 2 is tipped, therefore reliably securing the body against sliding off from the chassis.

What I claim is:

A toy freight car comprising a chassis, a car body mounted on and removable from said chassis, means for securing said body against displacement, said car body comprising a bottom plate, side walls and joints connecting said bottom plate and side walls so that the side walls may be tilted, and means provided on said chassis and said body and being adapted to engage each other, upon tilting of a side wall, said means forming a hinge so that the body may be tipped towards the tilted side wall, said joints each comprising at least two hinge eyes fastened to the bottom plate and a side wall respectively, and a pivot passing through said eyes, the eyes having radial slots of a size corresponding at least to the diameter of the pivot, and the slots of the eyes being provided in the bottom plate and angularly staggered relatively to the slots of the eyes fastened to the wall.

References Cited in the file of this patent

UNITED STATES PATENTS

| | | |
|---|---|---|
| 2,281,393 | Smith | Apr. 28, 1942 |
| 2,305,491 | Pettit | Dec. 15, 1942 |
| 2,356,280 | Smith | Aug. 22, 1944 |
| 2,540,317 | Baggott | Feb. 6, 1951 |
| 2,576,990 | Baggott | Dec. 4, 1951 |
| 2,581,201 | Pettit | Jan. 1, 1952 |
| 2,585,731 | Bonanno | Feb. 12, 1952 |